United States Patent Office 3,501,570
Patented Mar. 17, 1970

3,501,570
CHROMOMYCIN $A_3$ DERIVATIVES AND PRODUCTION THEREOF
Komei Mizuno, Norio Sugita, and Mitsuko Asai, Osaka, and Akira Miyake, Hyogo, Japan, assignors to Takeda Chemical Industries, Ltd., Osaka, Japan
Continuation of application Ser. No. 413,401, Nov. 20, 1964. This application Nov. 18, 1968, Ser. No. 778,010
Int. Cl. A61k 21/00
U.S. Cl. 424—119   3 Claims

ABSTRACT OF THE DISCLOSURE

Chromomycin $A_3$ hemisuccinates and water soluble salts thereof are provided herein having antibiotic properties. The present invention also provides for a method for the production of chromoycin $A_3$ hemisuccinates which comprises reacting chromomycin $A_3$ with either succinic anhydride or succinyl chloride in a solvent at a temperature below about 10° C.

---

Figure 1:
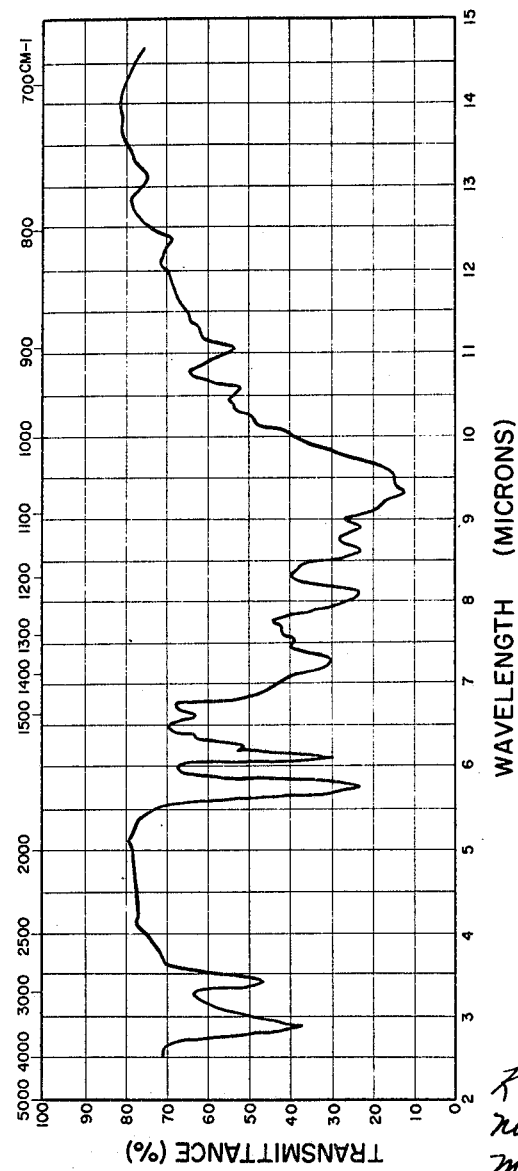

The present application is a streamlined continuation application of U.S. application Ser. No. 413,401, now abandoned.

This invention relates to new and useful chromomycin $A_3$ derivatives and to the production thereof.

Chromomycin $A_3$ is a useful and commercially available antibiotic which inhibits the growth of gram-positive bacteria. Chromomycin $A_3$ is, however, rather insoluble in water, so that it has been difficult to use the antibiotic in pharmaceutical preparations in the form of parenterally administrable solutions.

Chromomycin $A_3$ has in its molecule many functional groups, including alcoholic hydroxyl and phenolic hydroxyl groups. Attempts have been made to introduce hydrophilic groups into such functional groups in the chromomycin $A_3$ molecule. However, the results were fruitless: in some cases the obtained derivatives were not as soluble in water as desired for practical purposes, and in other cases the obtained derivatives, even if they were water-soluble, lacked the antibiotic activity of chromomycin $A_3$.

According to the present invention, it has been found that partial esterification of chromomycin $A_3$ with succinic acid or a reactive derivative thereof fulfills the requirements and that the product, chromomycin $A_3$ hemisuccinate and its alkali metal, alkaline earth metal and ammonium salts are sufficiently water-soluble and effectively retain the antibiotic activity of chromomycin $A_3$.

It has also been found that in the molecule of chromomycin $A_3$ hemisuccinate, not more than three hydrogen atoms of alcoholic hydroxyl groups of the parent chromomycin $A_3$ have been replaced by the corresponding number of groups of the formula $-CO-CH_2-CH_2-COOH$, and that chromomycin $A_3$ hemisuccinate as well as its alkali metal, alkaline earth metal and ammonium salts have the same antibiotic activity as does chromomycin $A_3$, while the esters of chromomycin $A_3$ formed between a phenolic hydroxyl group of chromomycin $A_3$ and the carboxyl group of succinic acid $$(-CO-CH_2-CH_2-COOH)$$

have little or none of the antibiotic activity of chromomycin $A_3$.

The primary object of the present invention is to provide chromomycin $A_3$ hemisuccinate which is useful as a non-toxic parenterally or orally administrable therapeutic agent, because—like the parent chromomycin $A_3$—it inhibits the growth of gram-positive bacteria, and is soluble in water.

A further object of the present invention is to provide a method for producing chromomycin $A_3$ hemisuccinate as well as its alkali metal, alkaline earth metal and ammonium salts.

In accordance with this invention, chromomycin $A_3$ hemisuccinate is produced by allowing chromomycin $A_3$ to react with succinic acid or a reactive derivative thereof such as succinic anhydride or succinyl chloride in a solvent at a temperature below 10° C., desirably below 0° C. The solvent used most preferably is pyridine. The said process is preferably conducted in the presence of a basic substance such as pyridine or quinoline. The chromomycin $A_3$ hemisuccinate thus produced in the reaction mixture is isolated by utilizing means with adequate consideration given to the properties of chromomycin $A_3$ hemisuccinate, for example, differences between the chromomycin $A_3$ hemisuccinate and the impurities in solubility, in distribution ratio in liquid phases, in adsorbability or in ion-coherence.

Chromomycin $A_3$ hemisuccinate can form the corresponding salts of alkali metals, alkali earth metals and ammonium at the carboxyl group of chromomycin $A_3$ hemisuccinate and generally these salts are more easily soluble in water than the free chromomycin $A_3$ hemisuccinate, and these salts also fall within the scope of this invention. Among these salts, alkali metal salts of chromomycin $A_3$ hemisuccinate are preferably used as they are freely soluble in water and can be produced in a per se conventional manner, for example, reaction of chromomycin $A_3$ hemisuccinate with alkali such as sodium hydrogen carbonate or potassium hydrogen carbonate.

In the molecule of chromomycin $A_3$ hemisuccinate thus obtained, the hydrogen atoms of not more than three alcoholic hydroxyl groups of chromomycin $A_3$ are replaced by the corresponding number of groups of the formula $-COCH_2CH_2COOH$, while the phenolic hydroxyl groups of the chromomycin $A_3$ structure are not esterified. Generally the chromomycin $A_3$ hemisuccinate, in which two alcoholic hydroxyl groups of chromomycin $A_3$ are esterified, is obtained abundantly.

These chromomycin $A_3$ hemisuccinates as well as their water-soluble salts, e.g. alkali metal salts, alkaline earth metal salts and ammonium salts retain the antibiotic activity of chromomycin $A_3$, and are more soluble in water and of lower toxicity than chromomycin $A_3$. The products of the present invention are thus useful for the same purposes as chromomycin $A_3$, i.e. as therapeutic agents for the treatment of such diseases as are caused by *Bacillus subtilis* and *Staphylococcus aureus*. Thus, for example, the new hemisuccinates are useful e.g. in the treatment of wounds infected by *B. subtilis* and of suppurative lesions formed by *Staphylococcus pyogenes* var. *aureus* in any animal organ or tissue.

The following examples set forth a presently preferred illustrative but non-limitative embodiment of the invention.

Example 1

A small quantity of granular sodium hydroxide is dissolved in 98 milliliters of pyridine. In the pyridine solution, 14 grams of purified chromomycin $A_3$ is dissolved at a temperature between 0 and $-5°$ C. To this pyridine solution of chromomycin $A_3$, 28 grams of succinic anhydride is added and then the mixture is agitated at a temperature between 0 and $-5°$ C. for 40 hours. The reaction mixture is poured into about 250 milliliters of cold water and the reaction product is extracted with 300 milliliters of ethyl acetate. The ethyl acetate layer is washed with water, and then shaken with 5 to 10 percent aqueous formic acid solution to completely remove pyridine from the ethyl acetate layer. The ethyl acetate layer is washed with water and shaken with about 0.5 percent aqueous sodium hydrogen carbonate solution to remove excess of formic acid from the ethyl acetate layer. The ethyl acetate layer is shaken with an aqeous sodium hydrogen carbonate solution of the same concentration as above. The yellowish aqueous layer is collected. To this aqueous solution is added two to three times as much water as the aqueous solution to dilute the concentration of sodium hydrogen carbonate in the aqueous solution. This aqueous solution is extracted with ethyl acetate several times until the yellowish color in the ethyl acetate layer vanishes. 5 percent aqueous formic acid solution is added to the aqueous solution to acidify the latter to a pH of about 4 to 4.5, then is subjected to extraction with 300 milliliters of ethyl acetate. This ethyl acetate extract is washed with water several times to remove formic acid practically. The ethyl acetate solution is dried with anhydrous sodium sulfate and then concentrated under reduced pressure at a low temperature. To the residue is added petroleum ether to give about 6.5 grams of yellowish precipitate. 6.5 grams of the precipitate is dissolved in about 30 milliliters of ethyl acetate. To the ethyl acetate solution is added about 120 milliliters of diethylether to give yellowish precipitate. The precipitate is washed with diethyl ether and then with petroleum ether to give about 5.3 grams of homogeneous yellowish powder of chromomycin $A_3$ hemisuccinate.

The physico-chemical and biological properties of the chromomycin $A_3$ hemisuccinate thus produced are as follows:

(1) Elementary analysis

Calculated for $C_{51}H_{72}O_{23}.H_2O.2C_4H_4O_3$: C, 55.70%; H, 6.50%; $OCH_3$, 4.88%. Found (Chromomycin $A_3$ hemisuccinate dried at 60° C.): C, 55.74%; H, 6.86%; $OCH_3$, 4.89%.

(2) Specific rotation $[\alpha]_D^{23°} = -45 \pm 10°$ (c.=1, absolute ethanol).
$[\alpha]_D^{23°} = -31 \pm 7°$ (c.=1, absolute methanol).

(3) Absorption spectrum

Figure 2:
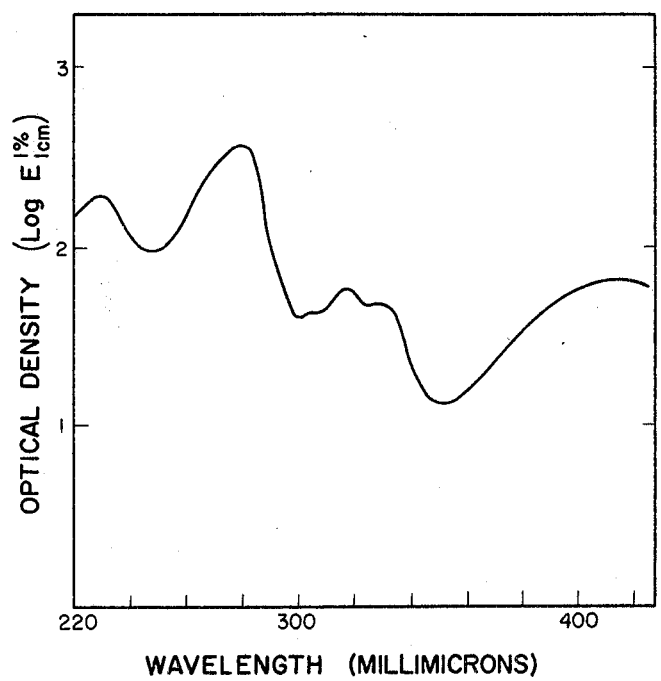

Its ultraviolet absorption spectrum measured in ethanol is shown on FIGURE 2 and its maximum absorption bands are as follows:

| $\lambda_{max}$ (milli $\mu$) | 230 | 280.5 | 305 | 319 | 333 | 418 |
|---|---|---|---|---|---|---|
| $E_{1cm}^{1\%}$ | 186 | 362 | shoulder | 63.2 | 52 | 68 |

Ins infrared absorption spectrum measured by potassium bromide disk method is shown on FIGURE 1 and the significant absorption bands in microns are as follows:

| | |
|---|---|
| 2.9 (strong) | 7.7 (weak) |
| 3.4 (middle) | 8.1 (middle) |
| 3.65–3.8 (weak, broad) | 8.5 (middle) |
| 5.75 (strong) | 8.9 (weak) |
| 6.1 (strong) | 9.35 (strong) |
| 6.3 (weak) | 9.6 (shoulder) |
| 6.6 (weak) | 10.6 (weak) |
| 7.0 (shoulder) | 11.1 (middle) |
| 7.28 (middle) | 12.3 (weak) |
| 7.56 (weak) | 13.15 (weak) |

(4) Melting point

It softens at 162° C. to 165° C. and melts at 190° C. to 193° C. with decomposition.

(5) Appearance

Yellowish power.

(6) Color reaction

It shows blue with Barton's reagent which consists of equivolume of 1 percent aqueous ferric chloride and 1 percent aqueous potassium ferricyanide solution, and shows red of short duration with alkaline hydrogen peroxide solution, and reduces Fehling's reagent.

(7) Solubility

It is soluble in chloroform, ethyl acetate, dioxane, tetrahydrofuran, acetone, ethanol, and methanol; sparingly soluble in diethyl ether; insoluble in cyclohexane, petroleum ether; and easily soluble in aqueous sodium hydrogen carbonate solution containing sodium hydrogen carbonate equivalent to its free carboxyl groups.

(8) Thin layer chromatography

A homogeneous mixture of 30 grams of Silica Gel G (Merck, U.S.A.) and 60 milliliters of Theorell's buffer solution (pH 2.3, $\mu$: 0.07) is spread on a glass plate to form a 0.2 millimeter thin layer on the glass plate, which is then dried at 100° C. for one hour. This thin layer is then spotted with a solution of each of chromomycin $A_3$ and of chromomycin $A_3$ hemisuccinate in ethyl acetate. After drying, the spots are developed with a mixture of benzene, chloroform and methanol (1:2:1 by volume). Chromomycin $A_3$ and chromomycin $A_3$ hemisuccinate show Rf values of 0.67±0.1 and 0.40±0.1, respectively.

(9) Acute toxicity

The median lethal dose ($LD_{50}$) in mice is 11.78±0.56 milligrams per kilogram of body weight when administered intravenously, and 14.64±0.60 milligrams per kilogram when administered intraperitoneally.

(10) Local toxicity

The maximum tolerated doses of chromomycin $A_3$ hemisuccinate and chromomycin $A_3$, and the minimum injurious doses of these are shown in Table 1, where these doses are shown in micrograms per milliliter per rabbit.

TABLE 1

| | Chromomycin $A_3$ | Chromomycin $A_3$ hemisuccinate |
|---|---|---|
| Minimum injurious dose | 2 | 200 |
| Maximum tolerated dose | 1.5 | 150 |

As is shown in Table 1, chromomycin $A_3$ hemisuccinate is one hundredth of chromomycin $A_3$ in the local toxicity.

(11) Antimicrobial activity

It shows antimicrobial activities of 1500 to 2000 units per milligram against *Staphylococcus aureus* and 3500 to 7500 units per milligram against *Bacillus subtilis* measured by the Waksman dilution method.

The hemisuccinate produced according to the foregoing example is the di-hemisuccinate.

When the same reaction as in the foregoing example is carried out for about 15 to 20 hours instead of 40 hours, the mono-hemisuccinate is mainly produced, while the same reaction for about 60 to 70 hours affords mainly the tri-hemisuccinate. The activities and utilities of these are the same as for the di-hemisuccinate. It is also thus possible to produce a mixture of the three partial esters; these can be employed as such or may be separate in per se conventional manner.

The alkali metal, alkaline earth metal and ammonium salts can be produced in per se known manner from the unsalified partial esters. Preferred salts are for example the potassium, sodium, calcium and ammonium salts.

What is claimed is:

1. A method for the production of chromomycin $A_3$ hemisuccinate, in which the hydrogen atoms of not more than three alcoholic hydroxyl groups of chromomycin $A_3$ are replaced by the corresponding number of groups of the formula —$COCH_2CH_2COOH$, while the phenolic hydroxyl groups of the chromomycin $A_3$ structure are not esterified, which comprises reacting chromomycin $A_3$ with a member selected from the group consisting of succinic anhydride and succinyl chloride in a basic solvent selected from the group consisting of pyridine and quinoline at a temperature below about 10° C. and isolating chromomycin $A_3$ hemisuccinate.

2. A method for the production of chromomycin $A_3$ hemisuccinate, in which the hydrogen atoms of not more than three alcoholic hydroxyl groups of chromomycin $A_3$ are replaced by the corresponding number of groups of the formula —$COCH_2CH_2COOH$, while the phenolic hydroxyl groups of the chromomycin $A_3$ structure are not esterified, which comprises reacting chromomycin $A_3$ with a member selected from the group consisting of succinic anhydride and succinyl chloride in a pyridine-containing solvent at a temperature between about 0° and −5° C. and isolating chromomycin $A_3$ hemisuccinate.

3. Chromomycin $A_3$ hemisuccinate having the following properties:
  (a) Elementary analysis: Found (dried at 60° C.): C, about 55.74%; H, about 6.86%; $OCH_3$, about 4.89%.
  (b) Specific rotation:
    $[\alpha]_D^{23°} = -45 \pm 10°$ (c.=1, absolute ethanol)
    $[\alpha]_D^{23°} = -31 \pm 7°$ (c.=1, absolute methanol)
  (c) Absorption spectrum: Its infrared absorption spectrum measured by potassium bromide disk method shows the following significant absorption bands in microns: 2.9 (strong); 3.4 (middle); 3.65–3.8 (weak, broad); 5.75 (strong); 6.1 (strong); 6.3 (weak); 6.6 (weak); 7.0 (shoulder); 7.28 (middle); 7.56 (weak); 7.7 (weak); 8.1 (middle); 8.5 (middle); 8.9 (weak); 9.35 (strong); 9.6 (shoulder); 10.6 (weak); 11.1 (middle); 12.3 (weak); 13.15 (weak),
  (d) Melting point: It softens at 162° C. to 165° C. and melts at 190° C. to 193° C. with decomposition,
  (e) Appearance: Yellowish powder,
  (f) Color reaction: It shows blue with Barton's reagent which consists of equivolume of 1 percent aqueous ferric chloride and 1 percent aqueous potassium ferricyanide solution, and shows red of short duration with alkaline hydrogen peroxide solution, and reduces Fehling's reagent,
  (g) Solubility: It is soluble in chloroform, ethyl acetate dioxane, tetrahydrofuran, acetone, ethanol, and methanol; sparingly soluble in diethyl ether; insoluble in cyclohexane, petroleum ether; and easily soluble in aqueous sodium hydrogen carbonate solution containing sodium hydrogen carbonate equivalent to its free carboxyl group.

References Cited

UNITED STATES PATENTS 3,313,691   4/1967   Miyake et al. ———— 424–115

ALBERT T. MEYERS, Primary Examiner

DAVID M. STEPHENS, Assistant Examiner

U.S. Cl. X.R.

424—115